(No Model.)　　　　　　　　　　　　　　　　　　　2 Sheets—Sheet 1.

C. MICHAELSEN.
REGISTER.

No. 470,694.　　　　　　　　　　Patented Mar. 15, 1892.

Witnesses:
A. Schehl
A. Jonghmans

Inventor:
C. Michaelsen
by his attorneys
Roeder & Briesen (No Model.) 2 Sheets—Sheet 2.

C. MICHAELSEN.
REGISTER.

No. 470,694. Patented Mar. 15, 1892.

Witnesses:
A. Schiehl.
A. Jonghmans.

Inventor:
C. Michaelsen
by his attorneys
Roeder & Briesen

UNITED STATES PATENT OFFICE.

CORNELIUS MICHAELSEN, OF LÜBECK, GERMANY.

REGISTER.

SPECIFICATION forming part of Letters Patent No. 470,694, dated March 15, 1892.

Application filed October 16, 1891. Serial No. 408,894. (No model.)

*To all whom it may concern:*

Be it known that I, CORNELIUS MICHAELSEN, a subject of the Emperor of Germany, residing at Lübeck, Germany, have invented certain new and useful Improvements in Registers, of which the following is a specification.

This invention relates to a register which has two dial-plates, one upon the side accessible to the employer and the other on the side accessible to the clerk. The arbor carrying the pointers is turned by a key in the possession of the clerk until the pointers register the desired figure. The employer on depressing a button causes the pointers to turn back to zero, while a third pointer will remain over the aggregate figure. A complete revolution of this pointer will move forward a fourth pointer indicating the hundreds.

The invention consists in the various features of improvement more fully pointed out in the claims.

Figure 1:
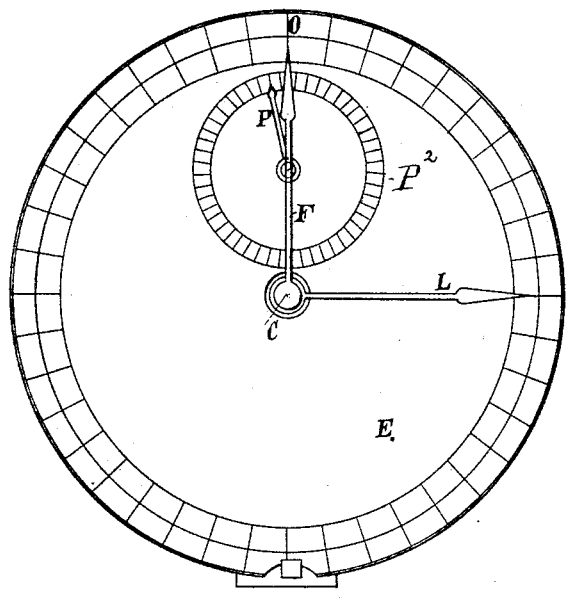
Figure 2:
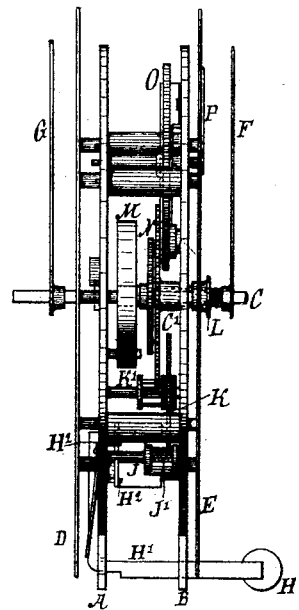
Figure 3:
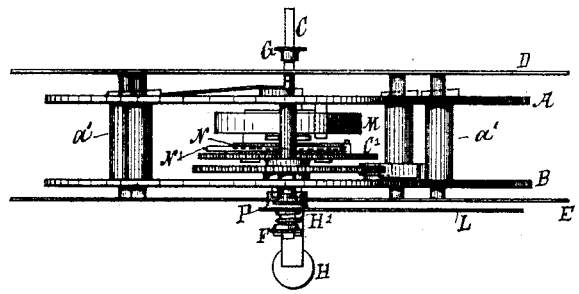
Figure 4:
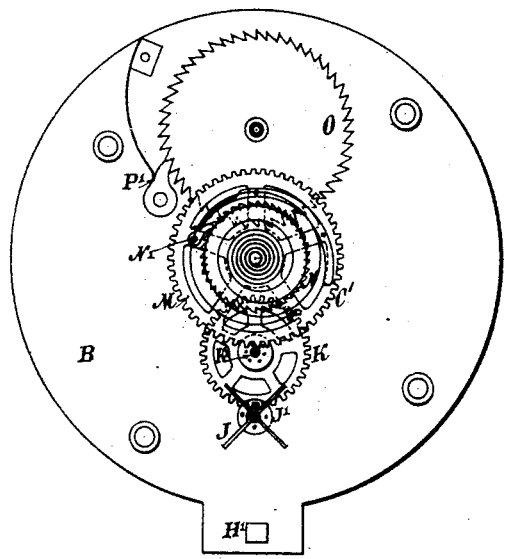
Figure 5:
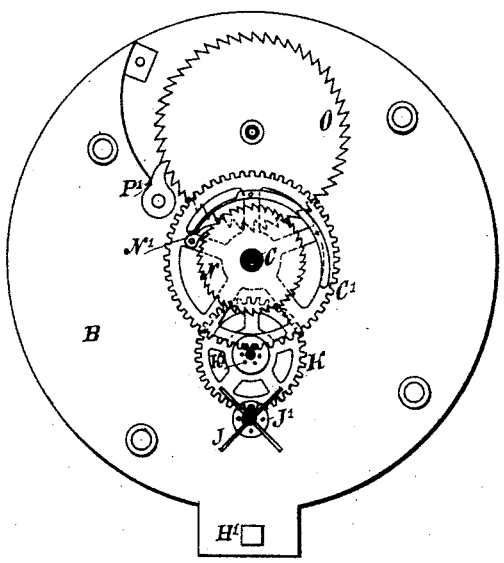
Figure 6:
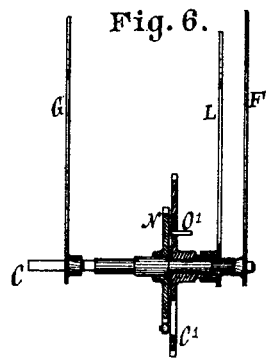

In the accompanying drawings, Figure 1 is a face view of the apparatus, exposing the dial accessible to the employer. Figs. 2 and 3 are side and plan views of the same. Figs. 4 and 5 are face views with the dial removed and representing the train of gearing with and without the spring M. Fig. 6 is a side view of the arbor, showing the wheels C' N in section.

The letters A B represent two metal plates connected by suitable posts $a'$ and constituting bearings for the central arbor C. Above each plate A B there is placed a dial D E, and each dial is traversed by a pointer G and F, secured to the ends of arbor C. One of these pointers F is accessible to the employer and the other pointer G is accessible to the clerk. The arbor C is squared beyond pointer G, so that the clerk can turn it by means of a key. Supposing the dials D and E have a hundred subdivisions and the clerk turns the axle C so that the pointer G registers "25," then the pointer F on the employer's side will register a like amount. The employer then presses a spring-knob H, by which both pointers F and G will spring back to zero.

The operating mechanism of the device is as follows:

J is a fly or vane, upon the axle of which is mounted a pinion J'. This pinion is driven by a toothed wheel K, which also has upon its axle a pinion K'. The pinion K' is driven by a toothed wheel C', that can turn freely upon the axle C. Upon the hub of the wheel C' is fitted a pointer L upon the employer's side. A coiled spring M is attached at one end to the axle C and at the other end to one of the plates A or B. This spring turns the axle C back when released, while the pointer L, carried by the loose wheel C', will remain pointing to the aggregate figure.

Adjoining the loose toothed wheel C' a ratchet-wheel N is mounted upon the axle C, Fig. 6. A spring-pawl N', carried by the loose wheel C', engages the teeth of the wheel N in such a manner that when the clerk turns the axle C the teeth of the wheel N pass the pawl N', and thus the loose wheel C' remains at rest while the coiled spring M is wound up.

The fly J, and consequently the whole train of gearing, is released by pressing upon the knob H. This knob is fixed to a spring-elbow H', carrying two pins $H^2$, engaging the fly J. The axle C will now be turned back by the spring M, taking with it the ratchet-wheel N and, by means of the pawl N', the loose wheel C'. The wheel C' carries the pointer L through a distance equal to that through which the main pointers G and F were before moved, and accordingly a corresponding number is added to the amount already indicated, while by means of the wheels C', K', K, and J' the fly J serves as regulator.

Upon the loose wheel C' is fixed a pin O', Fig. 6, which at each revolution moves forward one tooth of another ratchet-wheel O, which carries upon its axle a small pointer P. This pointer indicates on a small dial $P^2$, Fig. 1, the number of revolutions of pointer L, or the hundreds. The wheel O is provided with a spring-pawl P', which holds it in position.

What I claim is—

1. The combination of dials D E with arbor C, pointers F G, and with the fly J, having pinion J', ratchet-wheel K, having pinion K', ratchet-wheel C', having pointer L and click N', and with ratchet-wheel N, spring M, and push-button H for releasing the fly, substantially as specified.

2. The combination of dials D E with arbor C, pointers F G, wheel N, keyed to the arbor, wheel C', having click N', pin O', and pointer L, and with wheel O, engaged by pin O' and having pointer P, substantially as specified.

In testimony whereof I hereunto sign my name, in the presence of two subscribing witnesses, this 2d day of October, 1891.

CORNELIUS MICHAELSEN.

Witnesses:
ANDREW W. HARTWIG,
CARL TIEDT.